H. THORNE.
ANTISKID DEVICE FOR AUTOMOBILES, &c.
APPLICATION FILED NOV. 26, 1916.

1,236,500.

Patented Aug. 14, 1917.
2 SHEETS—SHEET 1.

WITNESSES:

INVENTOR.
Harold Thorne
BY
ATTORNEY

H. THORNE.
ANTISKID DEVICE FOR AUTOMOBILES, &c.
APPLICATION FILED NOV. 26, 1916.

1,236,500.

Patented Aug. 14, 1917.

UNITED STATES PATENT OFFICE.

HAROLD THORNE, OF NEW YORK, N. Y., ASSIGNOR, BY MESNE ASSIGNMENTS, TO WILLIAM H. PUTNAM, OF BROOKLYN, NEW YORK.

ANTISKID DEVICE FOR AUTOMOBILES, &c.

1,236,500.   Specification of Letters Patent.   Patented Aug. 14, 1917.

Application filed November 26, 1916. Serial No. 133,305.

*To all whom it may concern:*

Be it known that I, HAROLD THORNE, a subject of the King of Great Britain, and a resident of the borough of Manhattan, city, county, and State of New York, have invented certain new and useful Improvements in Antiskid Devices for Automobiles, &c., of which the following is a specification.

My improvements relate to the means set forth in my concurrent application for patent, Serial No. 131,986, filed Nov. 18, 1916, for preventing the lateral slipping or "skidding" of wheels, particularly those of automobiles;—the object being as in that case to afford a simple but effective substitute for the anti-skid chains ordinarily used for the purpose, said substitute consisting essentially of a rotatable member supported in juxtaposition to the rim of the wheel to which it is applied and a plurality of flexible frictional deterrents articularly connected with said rotatable member and adapted to be interposed by centrifugal force between the tread of the wheel and the surface with which it contacts, thereby increasing attritive resistance and counteracting any tendency of the wheel to yield transversely to the plane of rotation.

The present invention relates more particularly to means for retracting my anti-skid device when not desired for actual use, and for supporting the parts thereof out of possible danger of contact with objects lying on the road traversed by the vehicle, all as hereinafter fully set forth.

Figure 1:
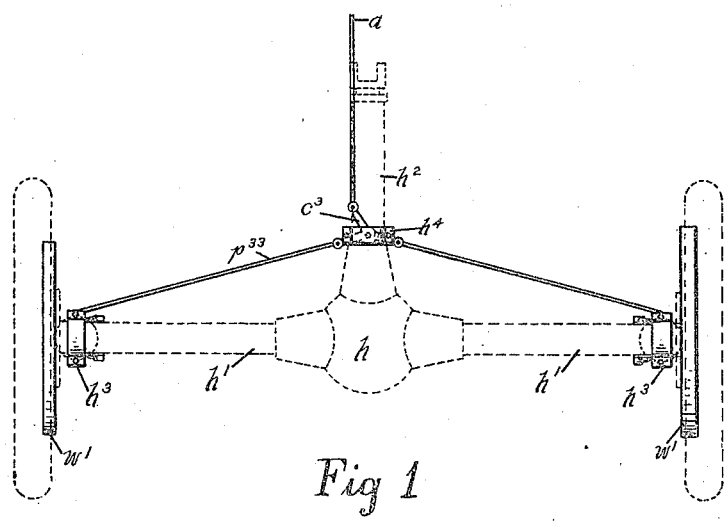
Figure 2:
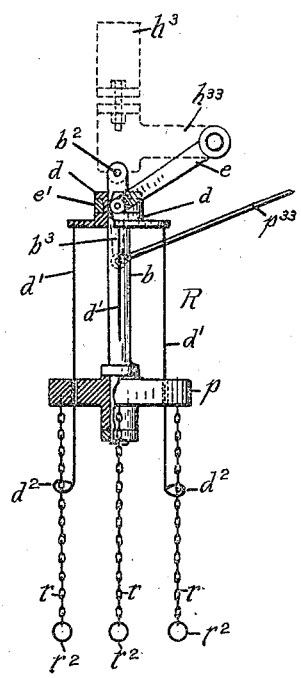
Figure 3:
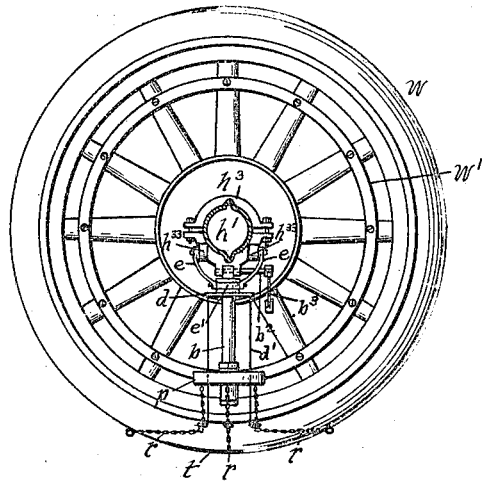
Figure 4:
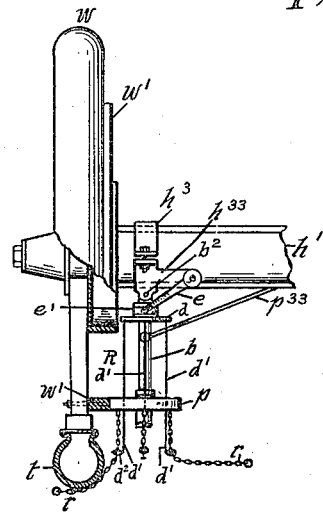
Figure 5:
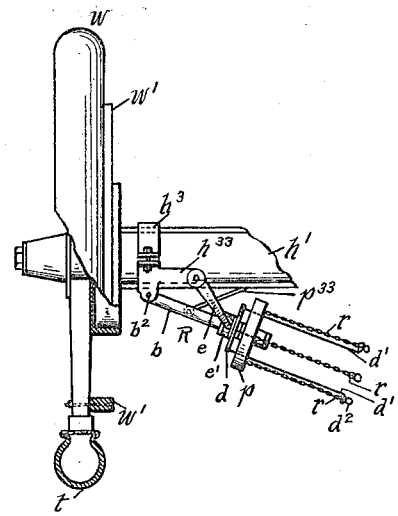

In the accompanying drawings,

Figure 1, a diagrammatic view of the rear wheels of an automobile showing the housing for the rear shaft, etc., and means retracting my anti-skid device;

Fig. 2, is a sectional elevation of the latter;

Fig. 3, an elevation of the inner side of an auto rear wheel showing the application thereto of my anti-skid device and retractive means;

Fig. 4, a sectional elevation taken at right angles to Fig. 3, and showing my anti-skid device in operative position;

Fig. 5, a like view showing the anti-skid device in retracted position.

In Fig. 1, the rear wheels $w$, $w$, and rear shaft housing are indicated in dotted lines, $h$, representing the differential casing, $h'$, $h'$, the axle sleeves; and $h^2$, the power shaft sleeve,—it being understood that while especially applicable to automobiles, my invention may be adapted to other vehicles also.

One of my anti-skid devices is preferably used in conjunction with each of the rear wheels $w$, $w$, of the vehicle; and as in such case there is a duplication of parts the description of one of my rotatable anti-skid devices will suffice for both, the only difference consisting in the reversal of parts on opposite sides of the vehicle.

In the present case I have shown my rotatable member R, as consisting essentially (1) of the pinion $p$, mounted on the lower extremity of the suspender $b$, and carrying directly attached to it the frictional deterrents $r$, $r$, and (2) the controller sleeve $d$, slidably mounted on said suspender $b$, and carrying the control rods $d'$, $d'$, each formed at its lower extremity with a loop $d^2$, which loosely encircles one of the flexible deterrents $r$, $r$. The suspender $b$, is pivotally attached by means of its trunnion $b^2$, to the lower member of the strap $h^3$, rigidly secured to the axle sleeve $h'$,—said lower member of the strap $h^3$, being also formed with extension arms $h^{33}$, $h^{33}$, to the ends of which are pivotally attached curved arms $e$, $e$, also pivotally attached to the swivel collar $e'$, which thus supports the controller sleeve $d$, the latter being slidably and rotatably suspended as it were, by said arms $e$, $e$, on the suspender $b$. That is to say the curved arms $e$, $e$, and swivel collar $e'$, form a stirrup for said rotatable controller sleeve $d$, so that when the suspender $b$, is turned on its pivot from the perpendicular position shown in Figs. 2, 3, and 4, to the inclined position shown in Fig. 5, said arms $e$, $e$, will cause the controller sleeve $d$, to slide along the suspender $b$, thereby projecting the control rods $d'$, $d'$, (which pass through the pinion $p$, as shown in Fig. 2) in such manner that their looped ends $d^2$, $d^2$, take up the slack and otherwise loose ends of the frictional deterrents $r$, $r$, and sustain them in elevated position until the suspender $b$, is again lowered into vertical position with the pinion $p$, resting against the annular drive member $w'$, which latter is rigidly secured concentrically to the wheel $w$.

This swing of the suspender $b$, upon its pivotal support is effected by means of a rod $p^{33}$, pivotally connected at one end to the trunnion arm $b^3$, (see particularly Fig. 3) rigidly secured to the trunnion $b^2$, which is in turn rigidly secured to the suspender $b$, and at the other end the rod $p^{33}$, is secured to one arm of a bell crank lever $c^3$, (Fig. 1) pivotally connected with the under side of the fulcrum block $h^4$,—the other arm of said bell crank lever $c^3$, being connected with the control rod $a$, extending to a pedal, lever or other manipulatory device situated in convenient proximity to the chauffer, by means of which the rotatable member R, can be readily lowered into operative position as in Figs. 2, 3, and 4, or retracted therefrom, into the position, relatively, indicated in Fig. 5, with the lower extremities of the flexible frictional deterrents $r$, $r$, well out of the way of ridges, stones, or other irregularities or obtrusive objects in or upon the road traversed.

The frictional deterrents, as stated in my aforesaid concurrent application No. 131,986, are formed preferably of suitable lengths of metallic chain, in the present case articularly connected at their inner ends directly to the pinion $p$, and being provided at their outer ends each with a ring or equivalent enlargement $r^2$, which prevents said outer end from escaping through the loop $d^2$, on the control rod $d$.

The latter not only perform the function of raising and supporting the retracted free ends of the deterrents $r$, $r$, as described, and as indicated in Fig. 5, but they also, as illustrated in Figs. 3, and 4, control and direct the swing of said free ends of the deterrents $r$, $r$, to and from the tread $t$, of the wheel $w$, thereby feeding them successively to the advancing wheel in the most effective manner to increase frictional resistance and prevent lateral slip or skid of the wheel.

The control rods $d'$, $d'$, are sufficiently stiff and rigid to transmit to the controller sleeve $d$, the rotary motion imparted to the pinion $p$, by reason of the peripheral contact of the latter with the annular drive member $w'$, on the wheel $w$;—and in this connection it may be stated that said pinion $p$, might, as provided for in my above named concurrent application No. 131,986, be a gear pinion, meshing with a drive member $w'$, provided with suitable gear teeth,—the result in either case being the same as that herein set forth.

What I claim as my invention and desire to secure by Letters Patent, is

1. In an anti-skid device of the character designated the combination of a rotatable member supported in juxtaposition to the rim of a vehicle wheel, a plurality of flexible frictional deterrents articularly connected with said rotatable member and adapted to be interposed by centrifugal force between the tread of the wheel and the surface with which it contacts, adjustable means slidable on and controlling and sustaining said flexible deterrents, and means for actuating said rotatable member.

2. In an anti-skid device of the character designated, the combination of a rotatable member supported in juxtaposition to the rim of a vehicle wheel, a plurality of flexible frictional deterrents articularly connected with said rotatable member and adapted to be interposed by centrifugal force between the tread of the wheel and the surface with which it contacts, adjustable means for controlling and sustaining said flexible deterrents consisting of control rods slidably engaging with said flexible deterrents and mounted upon an adjustable sleeve forming part of the rotatable member, means for actuating said rotatable member, and means for retracting it from operative position.

3. An anti-skid device of the character designated, comprising a suspender member pivotally supported on an axle sleeve in juxtaposition to a wheel, said wheel formed with an annular concentric drive member, a pinion rotatably mounted on said suspender member in contactual relation to said annular concentric drive member on the wheel, flexible frictional deterrents connected with said pinion, a controller sleeve slidably and rotatably mounted on said suspender member and linked to a stationary part, control rods attached to said controller sleeve and each formed with a loop encircling one of said flexible deterrents, and means for raising said suspender member and connections out of operative position and retaining the same in such retracted position with the frictional deterrents in alinement with and supported by said control rods.

4. An anti-skid device of the character designated, comprising a rotatable member, means for pivotally mounting the same, said member being also slidably mounted, a plurality of flexible frictional deterrents articularly connected with said rotatable member and adapted to be interposed by centrifugal force between the tread of the wheel and the surface with which it contacts.

5. An anti-skid device of the character designated, comprising a rotatable member, means for pivotally mounting the same, said member being also slidably mounted, a plurality of flexible frictional deterrents articularly connected with said rotatable member and adapted to be interposed by centrifugal force between the tread of the wheel and the surface with which it contacts, and means movable through said rotatable member and slidably connected with said deterrents.

6. An anti-skid device of the character designated, comprising a rotatable member, means for pivotally mounting the same, said member being also slidably mounted, a plurality of flexible frictional deterrents articularly connected with said rotatable member and adapted to be interposed by centrifugal force between the tread of the wheel and the surface with which it contacts, and means movable through said rotatable member and slidably connected with said deterrents, said deterrents having means preventing their separation from said slidable means.

HAROLD THORNE.

Witnesses:
 DOROTHY MIATT,
 GEO. WM. MIATT.

Copies of this patent may be obtained for five cents each, by addressing the "Commissioner of Patents, Washington, D. C."